United States Patent [19]
Yoshida

[11] Patent Number: 5,204,817
[45] Date of Patent: Apr. 20, 1993

[54] CAR MOUNTED NAVIGATION SYSTEM

[75] Inventor: Motomasa Yoshida, Tokyo, Japan

[73] Assignee: Clarion Co. Ltd., Tokyo, Japan

[21] Appl. No.: 652,879

[22] Filed: Feb. 8, 1991

[30] Foreign Application Priority Data

Feb. 15, 1990 [JP] Japan ................................ 2-34595

[51] Int. Cl.⁵ .......................................... G06F 15/50
[52] U.S. Cl. .................................... 364/449; 364/444;
340/990; 340/995
[58] Field of Search ...................... 364/443, 444, 449;
73/178 R; 340/988, 990, 995

[56] References Cited

U.S. PATENT DOCUMENTS

| | | | |
|---|---|---|---|
| 4,737,916 | 4/1988 | Ogawa et al. | 340/995 |
| 4,796,189 | 1/1989 | Nakayama et al. | 340/995 |
| 4,807,157 | 2/1989 | Fukushima et al. | 340/995 |
| 4,926,336 | 5/1990 | Yamada | 340/995 |
| 4,937,753 | 6/1990 | Yamada | 340/995 |
| 4,984,168 | 1/1991 | Neukrichner et al. | 340/995 |
| 5,036,471 | 7/1991 | Tamura et al. | 340/995 |
| 5,041,983 | 8/1991 | Nakahara et al. | 340/995 |
| 5,067,082 | 11/1991 | Nimura et al. | 340/988 |

FOREIGN PATENT DOCUMENTS 65648  3/1989  Japan.
149357 6/1989  Japan.

*Primary Examiner*—Gary Chin
*Attorney, Agent, or Firm*—Weingarten, Schurgin, Gagnebin & Hayes

[57] ABSTRACT

A car mounted navigation system uses map data of polygons defined by roads of a predetermined rank or more of significance, connects a starting polygon containing a starting point to a destination polygon containing a destination with a chain of polygons adjoining at common sides of each pair of adjoining polygons and arranged between the starting and destination polygons to compute a plurality of routes extending from the starting point to the destination polygon, each route including a combination of sides of the chain polygons, the starting polygon and the destination polygon. A car operator selects an appropriate route from the computed routes. The system requires neither need for a great amount of database-made map data nor need for an entry of map data with a digitizer.

11 Claims, 18 Drawing Sheets

CAR MOUNTED NAVIGATION SYSTEM

BACKGROUND OF THE INVENTION

1. Field of the Invention

The present invention relates to a car mounted navigation system.

2. Description of the Related Art

Generally, prior-art car mounted navigation systems store map data on a storage medium such as CD-ROM and displays the map data on the screen of a car mounted display in a car travel so as to indicate a current position and destination of a car on map images appearing on the display screen.

These car mounted navigation systems require the need for translating a map information into a database. In addition, since the prior-art car mounted navigation systems are self-contained and compare data produced by a car mounted distance sensor and azimuth sensor with map data in order to determine current positions of a car, they require accurate map data in order to achieve an error-free accurate navigation. Thus, it is critical to the prior-art car mounted navigation systems how many actual road geometries are accurately translated into a database.

The Geographical Survey Institute of Ministry of Construction takes a policy of correcting a 1/25,000 scale topographical national map providing a means for supporting the translation into the database once or more every 5 years. However, various land readjustments and road-makings or road-repairings quickly change geometries of roads, so that the national map cannot follow such changes to contain many regions which have not been corrected even for 10 years or more.

On the other hand, Japan Digital Road Map Association etc. are digitizing all of 2.5 m wide roads in Japan in order to translate data of the 2.5 m wide roads into a database. However, it seems that the digitization will much delay, a cost for maintaining the database of the roads will very high and the completion of the digitization will require a period of 6–10 years. In addition to the situations of the map database making, there is a problem in that the map database has many drawbacks so that the car mounted self-contained navigation system fails due to the inapplicability of road data of an area or a missing of road data.

In order to solve the problems, the applicant for the present inventors filed Japanese patent applications HEI. 1-65648 and HEI. 1-149357 both containing a car mounted navigation system which required no database-made map data. This navigation system picks up a course to be travelled of a car from a paper map and digitizes it into navigation data by means of a separate digitizer so as not to require a great amount of database-made map information. This car mounted navigation system has well eliminated the drawbacks in the prior-art car mounted self-contained navigation systems while yet requiring a data-making with the digitizer.

SUMMARY OF THE INVENTION

An objective of the present invention is to provide a car mounted navigation system requiring no need for a data-making with a digitizer. In order to achieve the objective, the present invention is characterized in that the navigation system stores map data of polygons defined by roads of a predetermined rank or more of significance, the system connects a starting polygon containing a starting point selected from the map data to a destination polygon containing a destination selected from the map data with a chain of polygons adjoining at common sides of each pair of adjoining polygons and arranged between the starting destination and second polygons to produce a plurality of route alternative extending from the starting point to the destination polygon, each route comprising a combination of sides of the chained polygons, the starting polygon and the destination polygon so that a car operator selects an appropriate route from the route alternatives.

Making map data from polygons defined by roads of a predetermined rank or more of significance is easier than a prior art of making map data. The present invention utilizes this advantage.

The present invention require neither need for a great amount of database made map data nor need for an entry of map data with an digitizer.

DESCRIPTION OF THE PREFERRED EMBODIMENT

The preferred embodiment of the present invention will be described in detail hereinafter.

Figure 1:
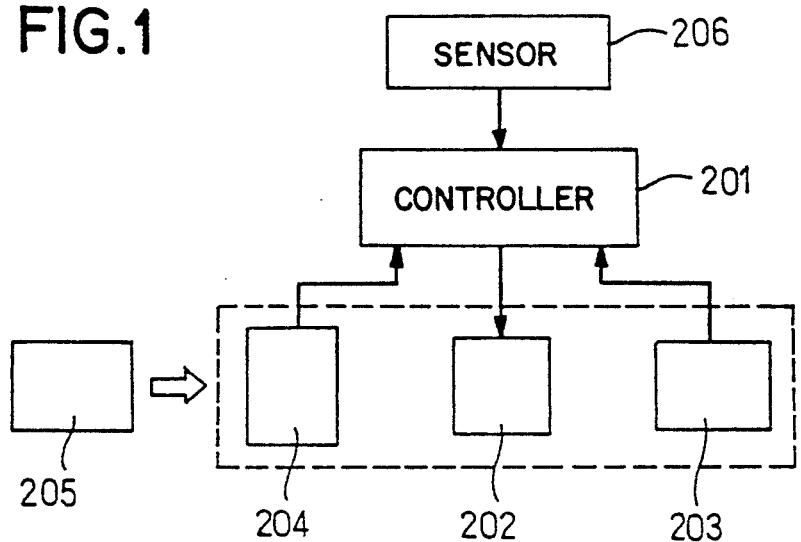
FIG. 1 is a block diagram of a car mounted navigation system of one embodiment of the present invention.

As shown in FIG. 1, a navigation system comprises a controller 201 made essentially with a microcomputer. The controller 201 contains and executes a program under a navigation algorithm. The controller 201 receives an operating signal from an operating device 203 and produces various displaying signal to a display 202. The controller 201 also receives signals required for navigation such as a travelled distance signal and a travel direction signal. In this embodiment, an IC card 205 contains map data and an IC card reader 204 reads in the map data from the IC card 205 and produces them to the controller 201.

Figure 2:
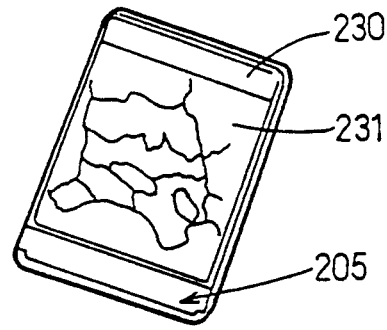
FIG. 2 is a perspective view of an IC card used in the navigation system of FIG. 1.
Figure 3:
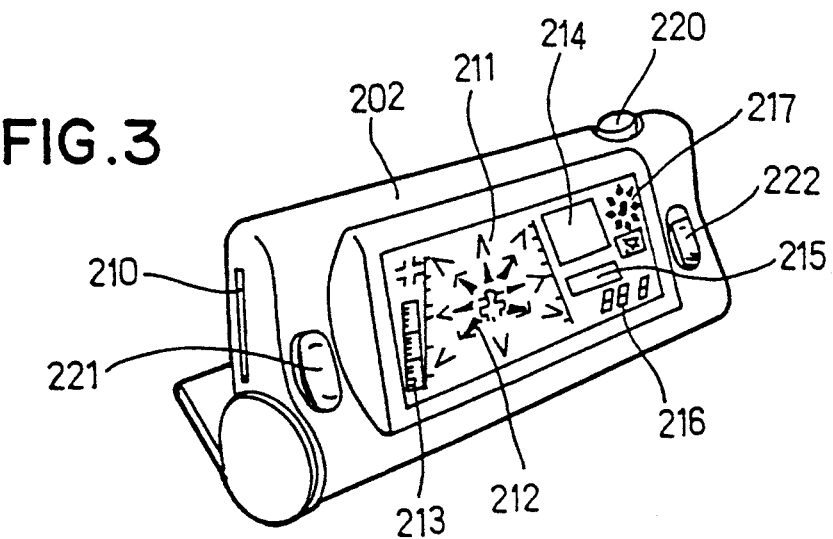
FIG. 3 is a perspective view of an apparatus embodying the navigation system of FIG. 1.

As shown in FIG. 2, an outer surface of the IC card 205 has geographical designations 230 and a schematic map 231 printed thereon. As shown in FIG. 3, the display 202 has the operating device 203 and IC card reader 204 mounted integrally thereto. The IC card reader 204 communicates with the IC card 205 through an IC card insertion slot 210 defined in a side of the display 202. The operating device 203 comprises a power switch 220, set switches 221 and 222. The display 202 comprises a to-destination direction arrow 211, a travel direction arrow 212 indicating a travel direction at intersections of roads etc., a distance indicator indicating a distance from a current position to a next intersection, an announcement indicator 214, and a gyrocompass 217. The display 202 also comprises a map entry announcement indicator 215 and a number indicator 216 operating when an operator enters a destination and a starting point. The navigation system of the present invention has a paper map corresponding to map data stored on the IC card 205 and a transparent coordinate sheet superimposed on the paper map so that the framework of the coordinate sheet is aligned with that of the paper map. The alignment of the paper map and coordinate sheet teaches coordinates of the starting point and destination and a direction to the destination. The operator enters the read coordinates of the starting point and destination into the controller 201 by means of the operating device 203.

Figure 5:
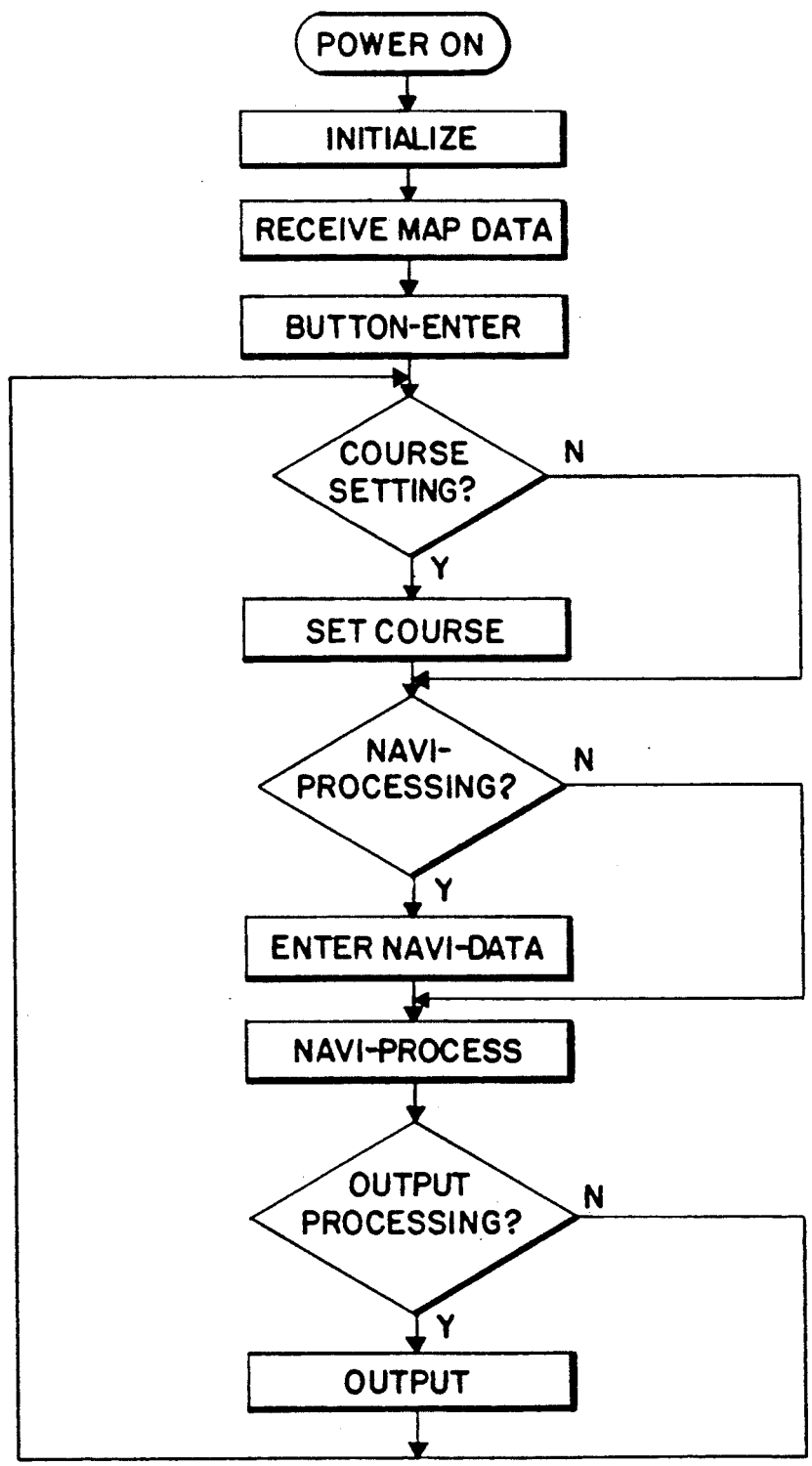
FIG. 5 is a general flowchart of a controller.

The controller 201 contains a standard navigation program and a program for a button-entry, outputting and course determination in order to execute the processings of a FIG. 5 general flowchart.

Figure 4:
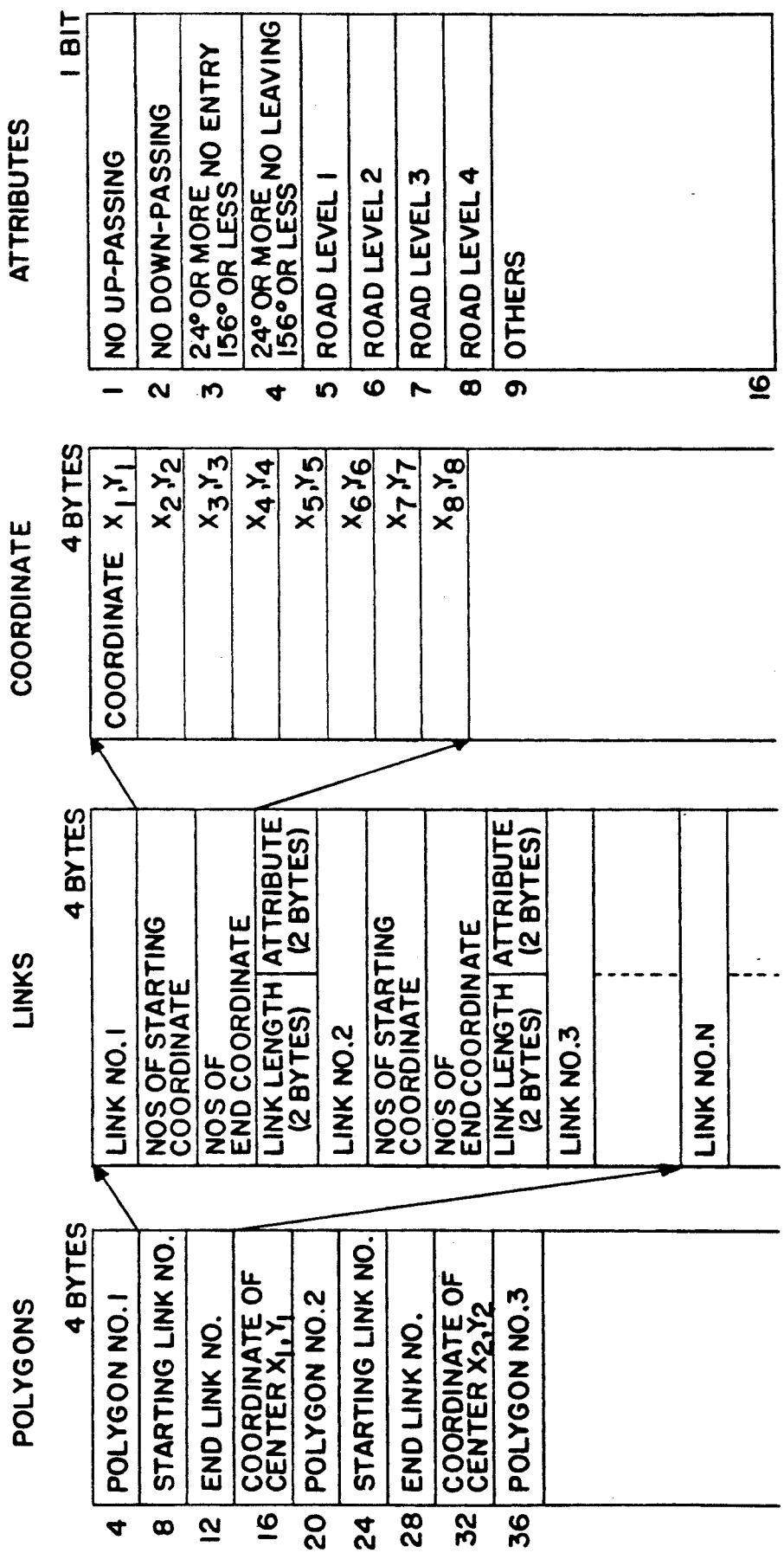
FIG. 4 is an illustration of stored contents of the IC card of FIG. 2.

The IC card 205 contains map data of polygons defined by roads of a predetermined rank or more. As shown in FIG. 4, the map data of polygons has a stratified structure of polygon data, link data, coordinate data and attribute data.

The polygons and a course setting using the polygons will be described hereinafter.

First, the roads of the map are classified into significant roads and insignificant roads. Indications of the insignificant roads are eliminated from the map. In classification, roads of a high use frequency, i.e., expressways, national highways and main roads are defined significant and on the other hand, 5.5 m or less wide ordinary roads are defined insignificant.

Figure 6:
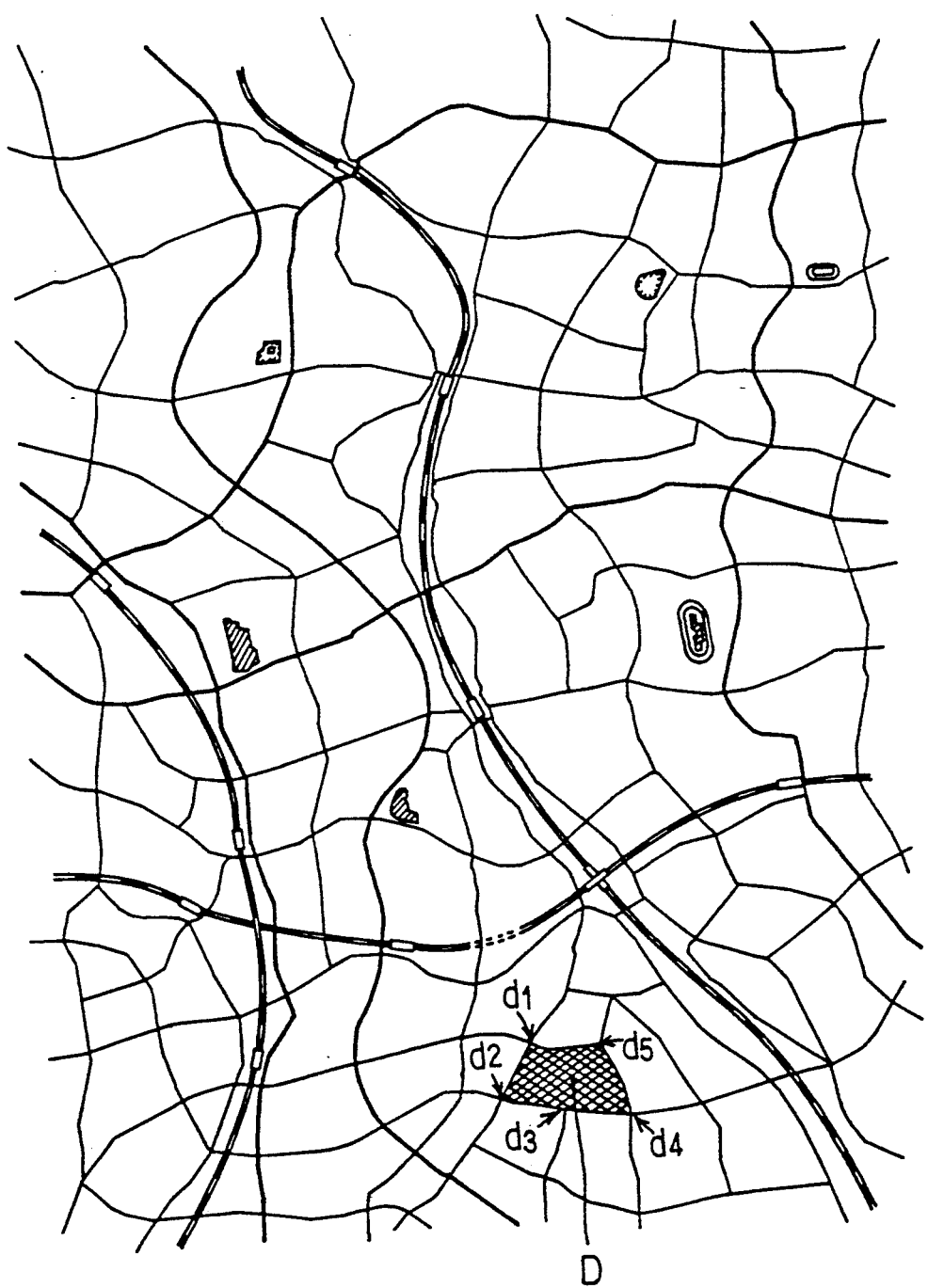
FIG. 6–10 are illustrations of a course setting.

FIG. 6 illustrates a map from which the insignificant roads have been separated in accordance with the above criteria. The significant roads intersect to provide intersections. A set of intersections provides a crosshatched polygon D which is a pentagon with five apices of the intersections d1, d2, d3, d4 and d5. The roads of the FIG. 6 map form a road network. In other words, the polygons including the polygon D adjoin and constitute the road network of the FIG. 6 map. A pair of adjoining polygons always have a common side.

Figure 7:
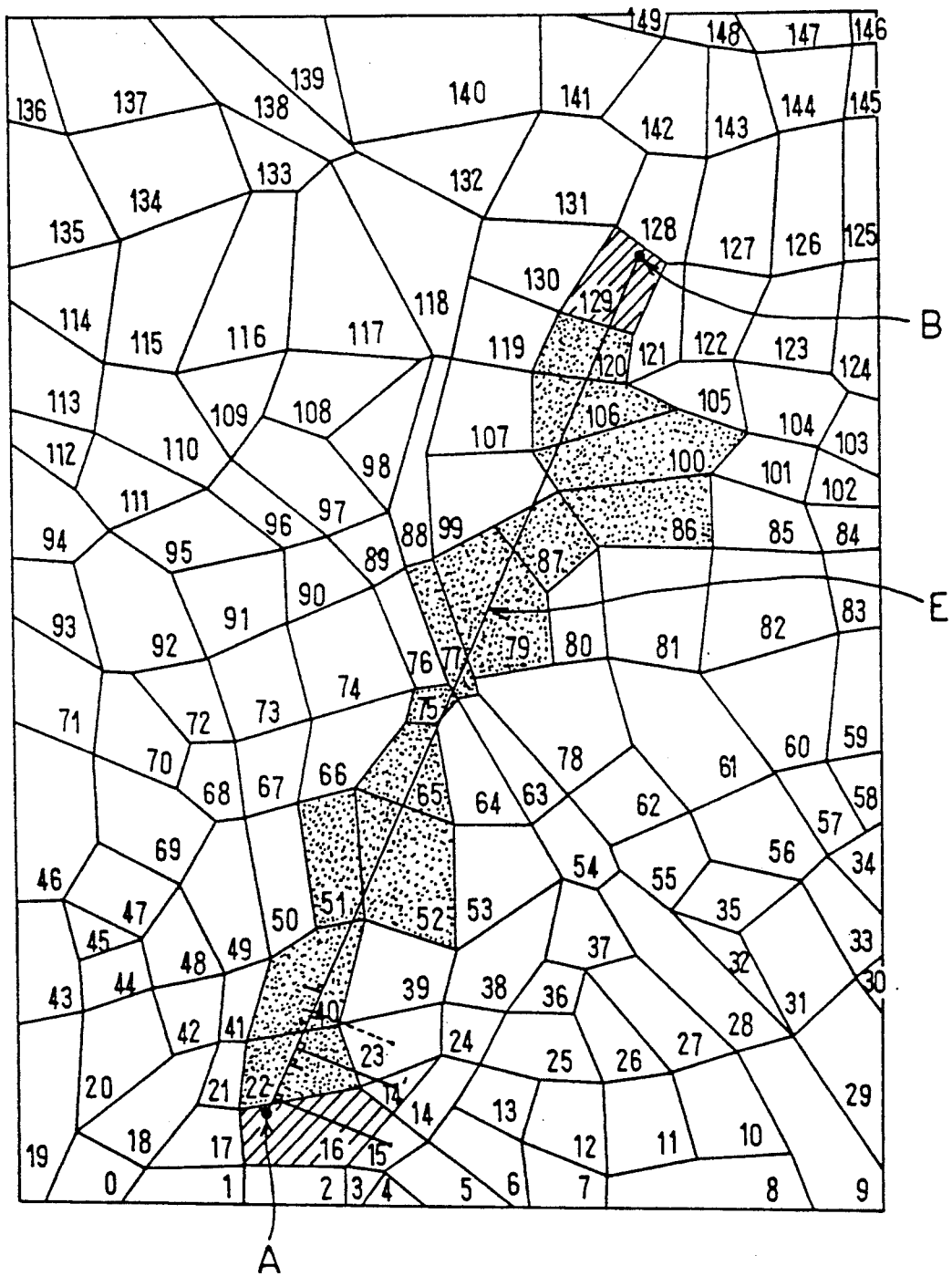

FIG. 7 linearizes and numbers the polygons of FIG. 6. A rule of placing the starting point on a significant road nearest to a current position of the car defines an A-point as the starting point. Thus, the car must travel to and find out the A-point without a support of the navigation system of the present invention. Then, the operator must accurately enter data of the actual place of a B-point providing the destination in accordance with the procedure described below.

Since a travel of the car from the A-point to B-point means that the car moves from a polygon 16 to polygon 129, the operator must determine the most efficient chain of polygons from the polygon 16 to polygon 129 in order to most quickly arrive the destination. Then, following sides of the chain of polygons from the polygon 16 to polygon 129 provides a plurality of travelled routes. The operator can select a suitable one from the travelled routes. One example of a process of determining the chain of polygons and selecting the travelled route will be described hereinafter.

As shown in FIG. 7, a straight line E connects the A-point and B-point. The navigation system previously stores data of the centers of the polygons and equals these data with the polygon Nos. First, each of the polygons 2, 15, 14', 22 and 17 all of which adjoin the polygon 16 is normalized by the normal to the straight line E extending from the center of the polygon so that the polygons 2 and 17 are eliminated since the feet of the normals thereof fall outside the straight line E and on the other hand, the polygons 15, 14' and 22 are secured since the feet thereof fall within the straight line E. Then, one of the secured polygons 15, 14' and 22 which has the shortest normal to the straight line E is selected and finally secured. Thus, the polygon 22 is secured. Then, each of polygons 23, 40 and 21 all of which adjoin the polygon 22 is normalized in essentially the same manner as described above. Thus, the polygon 40 which has the shortest normal to the straight line E is secured. Polygons 51, 52, 65, 75, 77, 79, 87, 86, 100, 106 and 120 are secured in essentially the same manner as described above. In the selection of the polygon 100, the system precludes the polygon 99 which has the shortest normal among the polygons 80, 99 and 100 adjoining the polygon 87 since the system has used the polygon 99 in the selection of the polygon 87.

Figure 8:
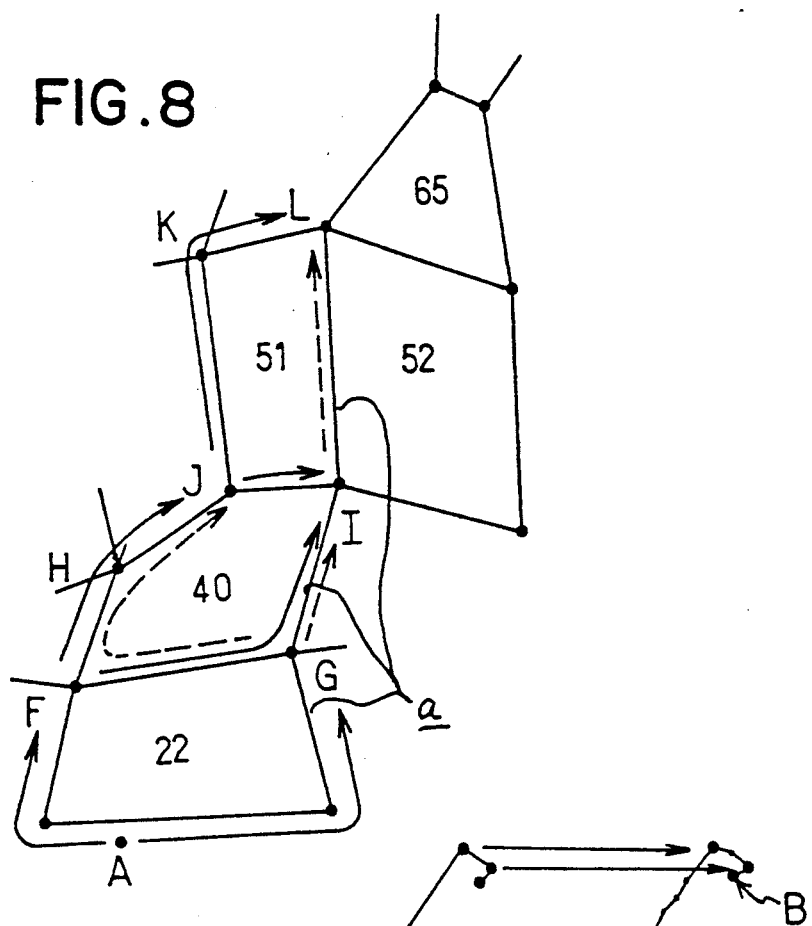

After the completion of the selection of the chain of the polygons, the system selects travelled sides (referred to as links hereinafter) of the chained polygons. The system analyzes data of the links of the polygons which have been stored on the IC card 205 as illustrated in FIG. 4. The analysis comprises determining whether a linkage of links of the chained polygons is passable or not, computing the total lengths of the linkages, connecting preferred roads and computing the total length of the connected preferred roads on the basis of priorities of expressways, tool roads, national highways, main roads and ordinary roads, a passage information of a one-way passage and a no-entry. In detail, the system first provides travelled route alternatives, each alternative comprising a linkage of links of the selected polygons chained between the starting point and destination, so as to preclude a no-entry link and then computes the total length of each alternative travelled route. FIG. 8 illustrates the provision of the alternatives in detail. Route alternatives from the A-point to the opposite points F and G of a common link FG of a pair of the adjoining polygons 22 and 40 comprise two route elements AF and AG. Route alternatives from the opposite points F and G to the opposite points I and J of a common link IJ of a next pair of the adjoining polygons comprise four route elements FHJ, FGI, GFHJ, and GI. Route alternatives from the opposite points I and J to the opposite points I and L of a common link IL of a next pair of the adjoining polygons 51 and 52 comprise four route elements JKL, JI, IL and II. The system previously registers as one route the route element II the length of which is zero for convenience. Thus, the system picks up all of possible route elements and then computes the total length of each of the route alternatives to provide the shortest route alternative.

The system checks relationships between computed total lengths of the route alternatives and connections of preferred roads at the link. In particular, the system should not select the route elements IJ, JK and KL but the route element IL because, as shown in FIG. 8, a case in which the car follows route elements GI and IL of the road a and an extension of the road a has apparently shorter length than a case in which the car sequentially follows route elements GI of the road a and out-of-the-road-a route elements IJ, JK and KL and then the extension of the road a. Thus, the system replaces the shortest route alternative having an out-of-route higher-priority road between adjoining polygons with a route alternative having continuous links between the adjoining polygons.

On the other hand, when the links FH and HJ of FIG. 8 are an expressway and the operator cannot use the route element GFJ and the system cannot employ the route element FGI for travelled course setting because of no-rightward-turn at the F-point, the system returns to the polygon 22, computes the normals to the straight line E for the polygons 21 and 23, selects the polygon 30 and discards the polygon 40. Then, the system repeats to select a chain of adjoining polygons including the polygon 30 in essentially the same manner as described above. Then, the system executes computations of passabilities of the links of the chained polygons, a conflict of preferred roads and the total lengths of route alternatives in essentially the same manner as described above.

Figure 9:
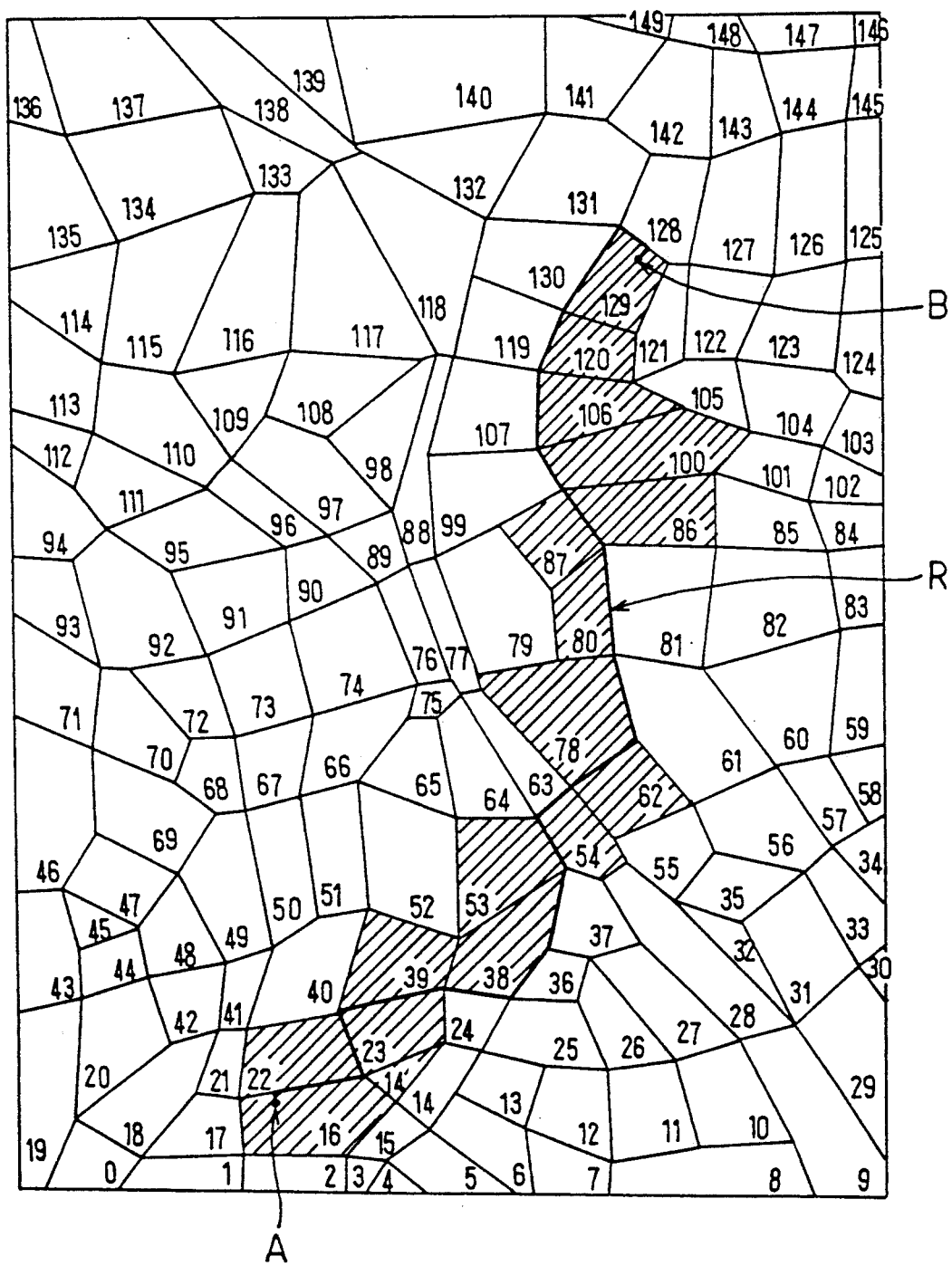

As shown in FIG. 9, the system finally determines the chained polygons and the travelled route.

Figure 10:
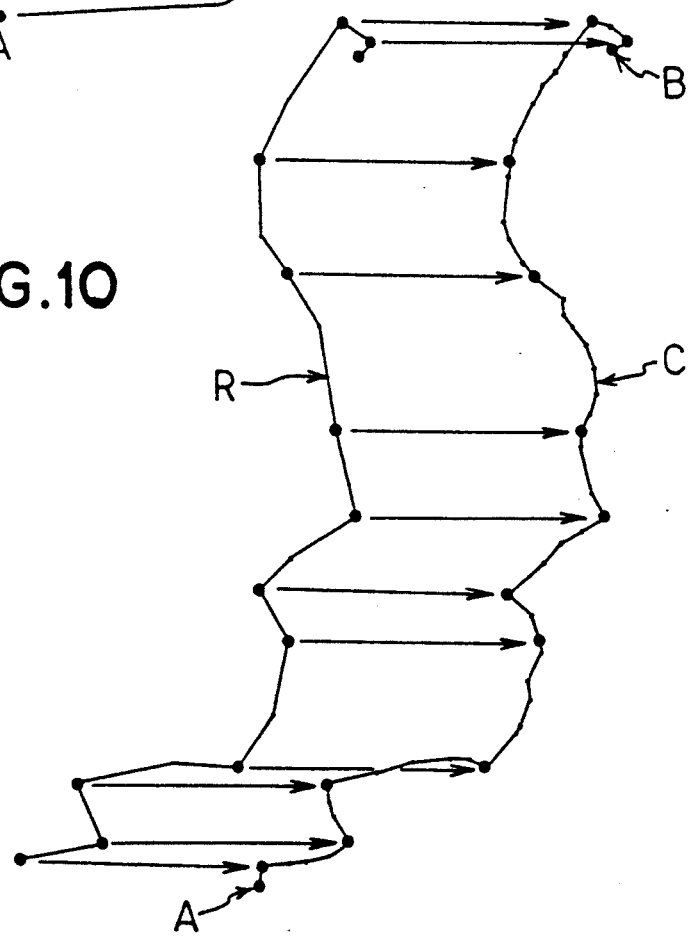

The links of each polygon, each of the links connecting two intersections of roads with a straight line, the determined travelled route R has no shaping points disclosed in Japanese patent applications HEI. 1-65648 and HEI. 1-149357. Therefore, if the travelled route R requires shaping points, they must be provided as shown in FIG. 10.

The controller 201 contains a program for executing the above travelled course setting. This embodiment improves a processing of handling a case in which the car goes out of an originally determined travelled course. The Japanese patent applications contain an invention indicating a direction to the originally determined travelled course when the car goes out of the originally determined travelled course. On the other hand, the navigation system of the present invention repeats to execute the above travelled course setting at a point out of the travelled course and resets a new travelled course. Thus, once the car enters a road out of the originally determined travelled course because of a traffic jam in or an under-construction of a road of the originally determined travelled course or a desire to go out of the originally determined travelled course, the display 202 first indicates measurements for restoring the originally set travelled course while the controller 201 executes the travelled course setting program to provide the new travelled course from the current position of the car to the destination as long as the IC card 205 stores data of a current position and the vicinity thereof the car. The above program enables the system to determine the chain of polygons from the starting point from the destination and the travelled course by the selection of links, on the basis of data of polygons, links, coordinates and notes stored on the IC card 205, execute a computation of a map matching on the basis of the determined travelled course, and recompute the appropriate travelled course alternatives and real-time determine the new travelled course when the car goes out of the originally determined travelled course.

The manner of operating the navigation system of the present invention will be described hereinafter.

First, the operator superimposes the transparent coordinate sheet on the paper map and reads X- and Y-coordinates of the starting point and destination. Then, the operator inserts the IC card 205 into the IC card insertion slot 210, turns the power switch 220 on to energize the navigation system and enters the X- and Y-coordinates of the starting point and destination by means of operations of the set switches 221 and 222.

Since this causes the map entry announcement indicator 215 to flash a page number of the map, the operator enters the map page number by means of the set switches 221 and 222. The number indicator 216 indicates the entry of the map page number. For example, when a desired page number is 25, twice pushing the set switch 221 sets a 10-digit numeral to be 2 and then five times pushing the set switch 222 sets a 1-digit numeral to be 5. Then, the map entry announcement indicator 215 changes to flash the starting point and an X-coordinate. The operator enters an X-coordinate of the starting point by means of the set switches 221 and 222 and power switch 220. When the X-coordinate of the starting point is 18.8, the operator enters the 10-digit numeral to be 1 by means of the set switch 221, the 1-digit numeral to be 8 by means of the set switch 222 and a 1-digit numeral of a decimal fraction to be 8 by means of the power switch 220. These switches 221, 222 and 220 are programmed to operate after the operator enters data of the starting point at the POWER ON step, the beginning step of the navigation program, by means of operating the set switches 221 and 222 and power switch 220. In essentially the same manner as in the entry of the data of the starting point, the operator sequentially enters a Y-coordinate of the starting point, X- and Y-coordinates of a next direction and X- and Y-coordinates of the destination. Then, the controller 201 executes the travelled route determination on the basis of data stored on the IC card 205.

As illustrated in FIG. 4, the IC card 205 stratifies the data of the polygons, links, coordinates and attributes. The data of each polygon are of four bytes and sequentially stratify a polygon number, a starting link number, an end link number, and coordinates of the center of the polygon.

The data of each link are of four bytes and sequentially stratify a link number, numbers of the starting coordinates of the link, numbers of the end coordinates of the link, a link length and an attribute. The data of coordinates of links comprise coordinates of roads arranged in a link order. The data of attributes are formed in a bit-unit and comprise no-passings, road levels and others which are identified by 0 or 1. The address numbers of the IC card directly serve as the starting-link number, the end-link number, the numbers of the starting coordinates, the numbers of the end coordinates, thus saving the data storage capacity of the IC card. IC cards having various data storage capacities are being sold. It will be described hereinafter how many map areas a single IC card having a 125K byte data storage capacity can store.

The main roads have a density of crossing each other at 1 km intervals in a map in the IC card. The IC card stores clicking points and shaping points at 80-m average spacings. Each link has 12.5 coordinates. Thus, the amount of data of each link is 62 bytes [=16 bytes+4×(12.5−1) bytes]. Dividing 102,200 bytes [=125,000 bytes−800 (=polygon number)×16 bytes−10,000 bytes (for address etc.)] by 62 bytes/link provides 1,600 links.

That is, since the 125 k-byte IC card can store an amount of data for 800 polygons, i.e., 1,600 links, it can record a 30 km (length)×25 km (width) rectangular area if each polygon has 1-km sides. Since each 125 k-byte IC card stores data for 2–4 cities of a commercial city map in view of a production cost for the IC card, a necessary IC card must only store data for a 20 km (length)×18 km (width) rectangular area.

Once the car actually starts from the starting point after the completion of the determination of the travelled course, the controller 201 executes the navigation program, computes current positions of the car in response to a distance signal and angle signal from the sensor 206, compares the current positions with stored road data to sequentially position the current positions on the map and causes the display 202 to indicate a travel direction etc.

Figure 11:
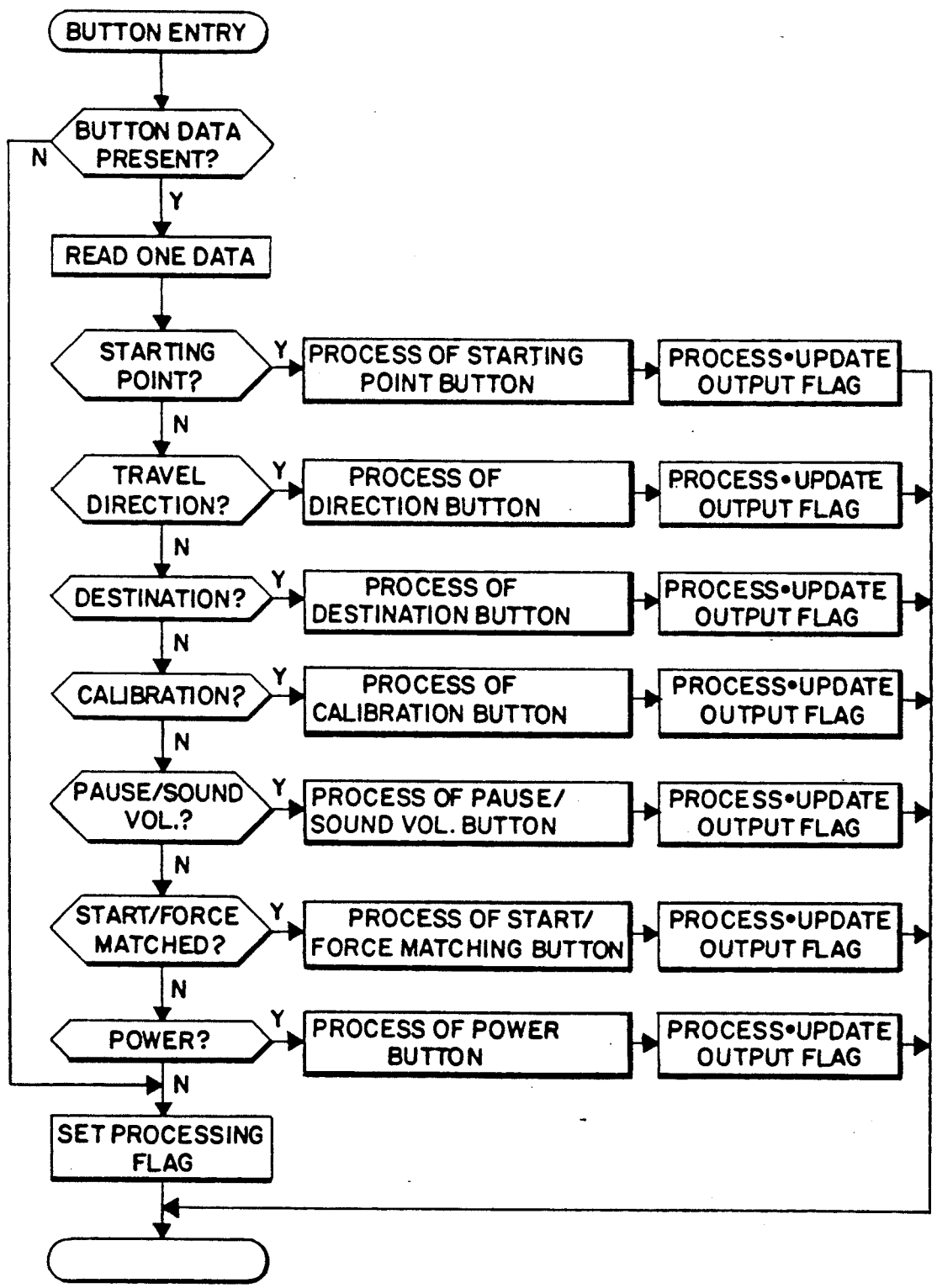
FIG. 11 is a flowchart of a button entry processing.
Figure 12:
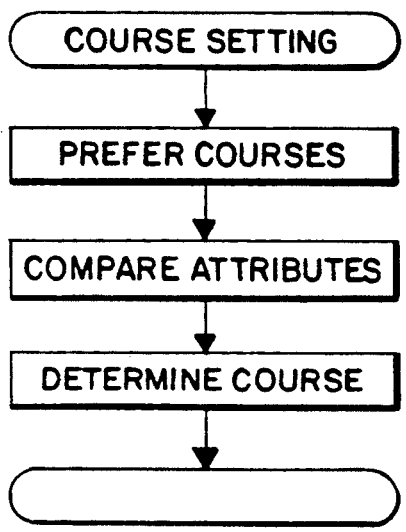
FIG. 12 is a flowchart of a course setting.
Figure 15:
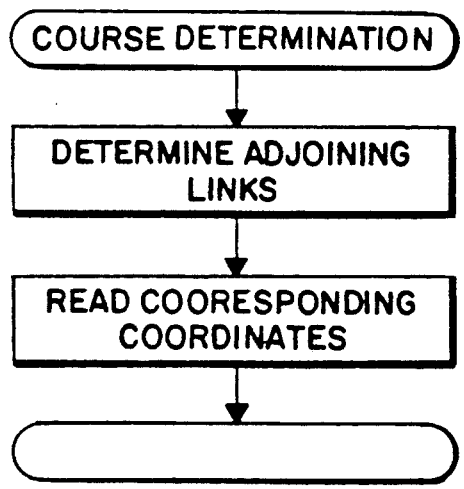
FIG. 15 is a flowchart of the travelled-course determination for producing data applicable to the navigation system of FIG. 1.
Figure 13:
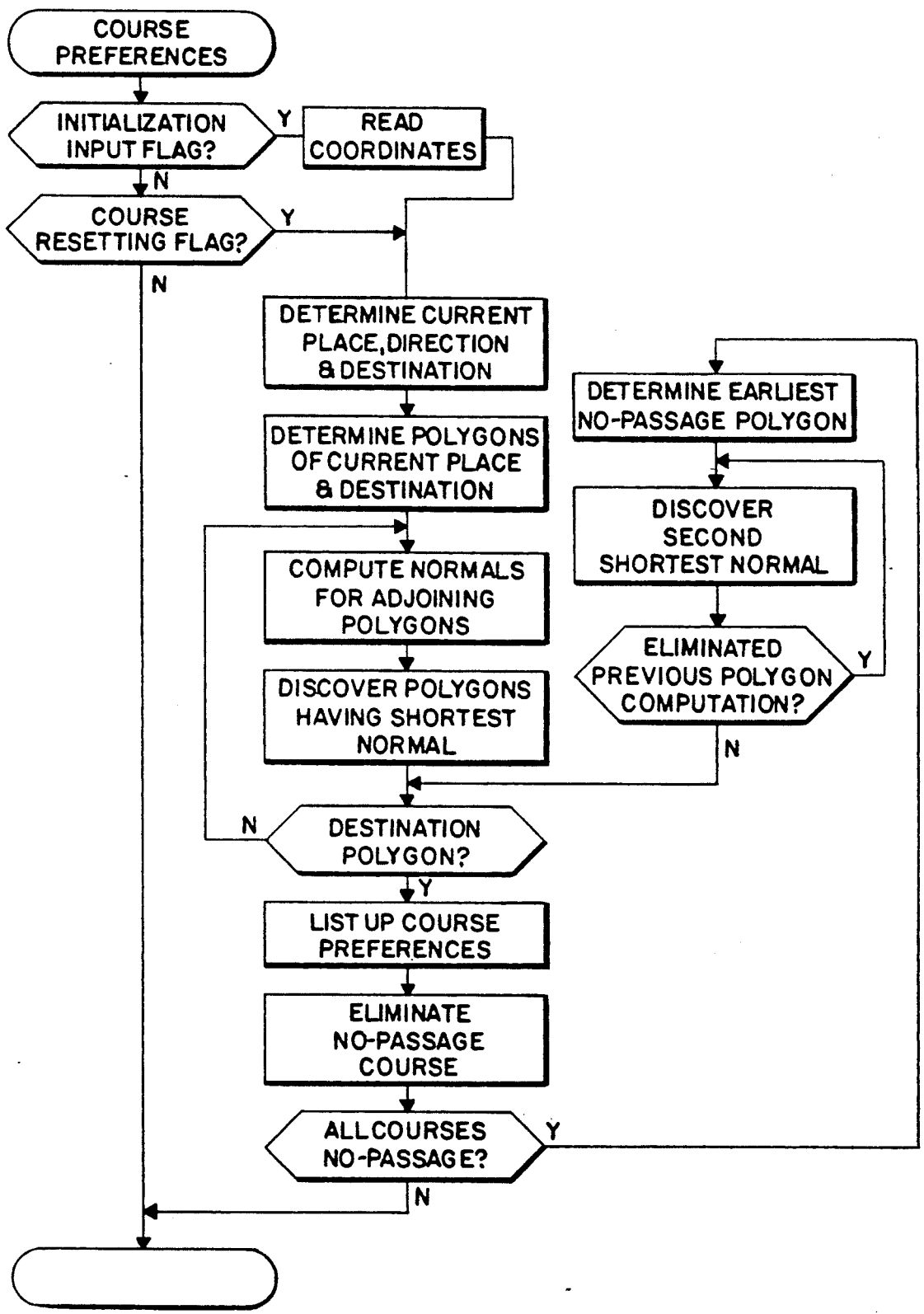
FIG. 13 is a flowchart of a travelled course alternatives entry processing.
Figure 14:
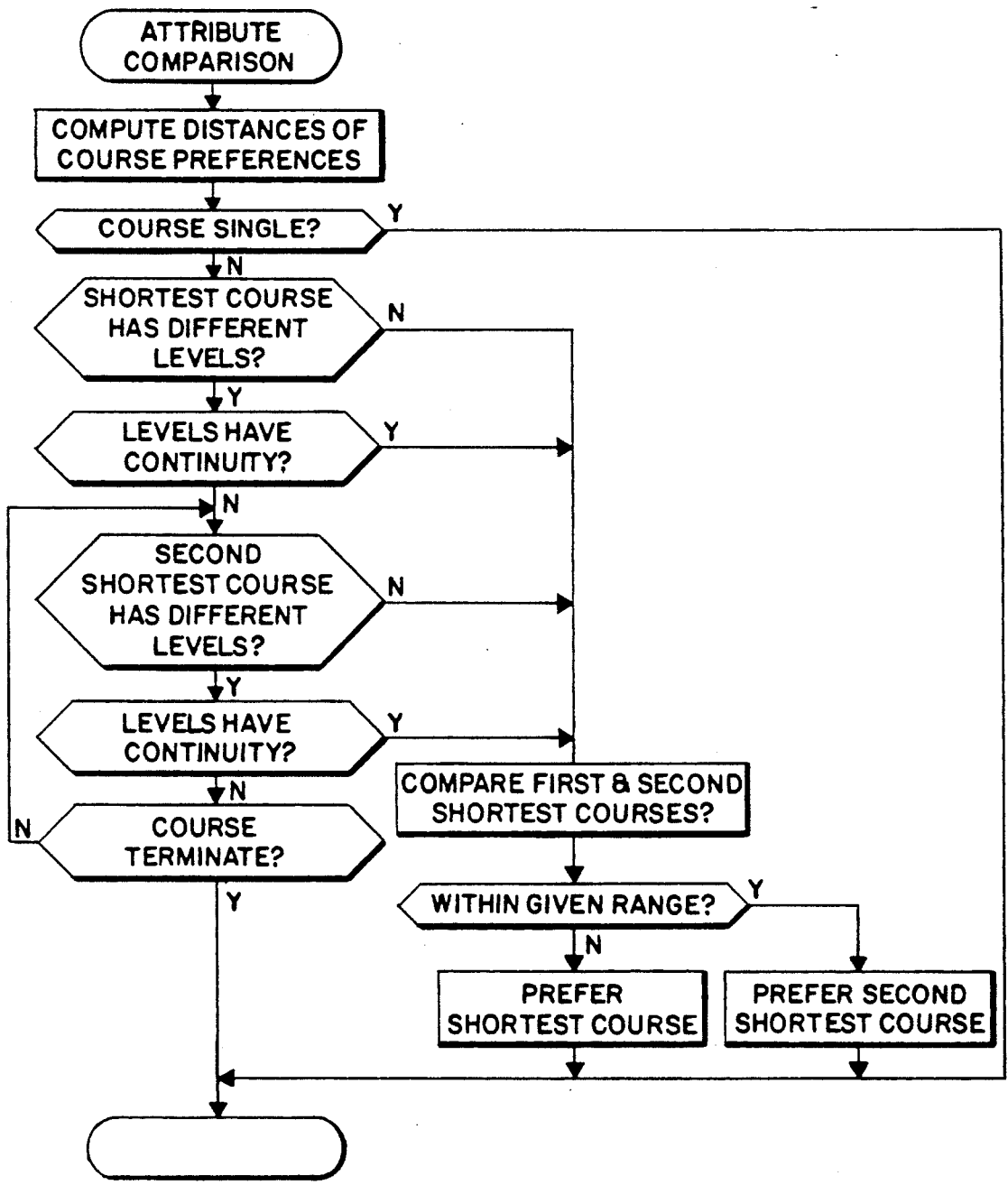
FIG. 14 is a flowchart of an attribute comparison for a travelled-course determination.
Figure 16:
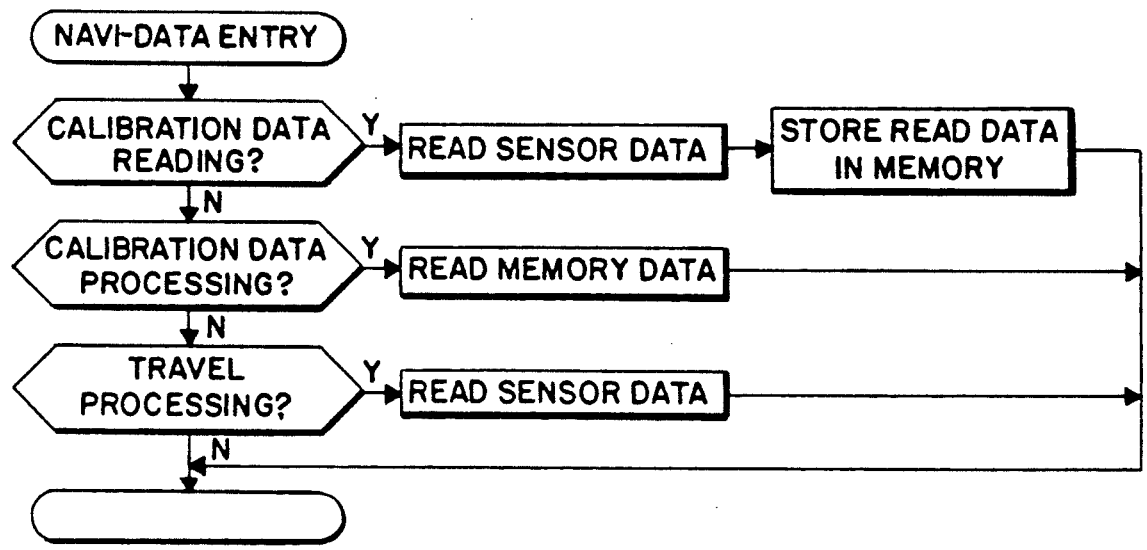
FIG. 16 is a flowchart of a navigation data entry processing.
Figure 17:
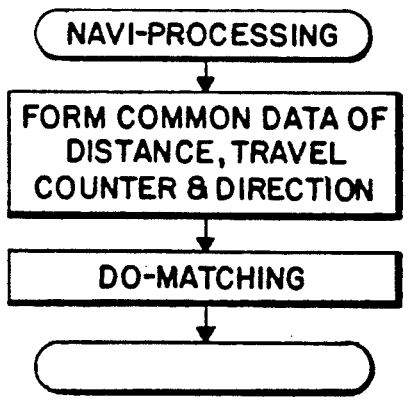
FIG. 17 is a flowchart of an actual navigation of a car.
Figure 18:
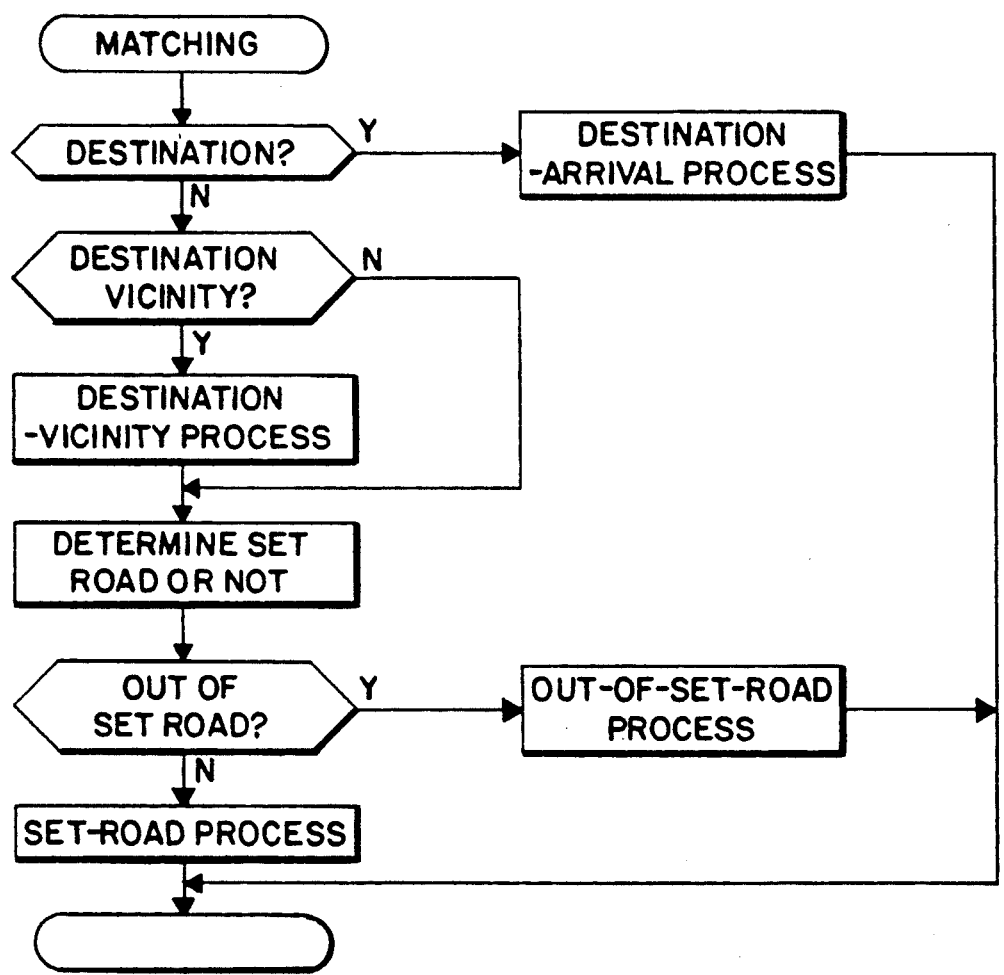
FIG. 18 is a flowchart of a map matching.
Figure 19:
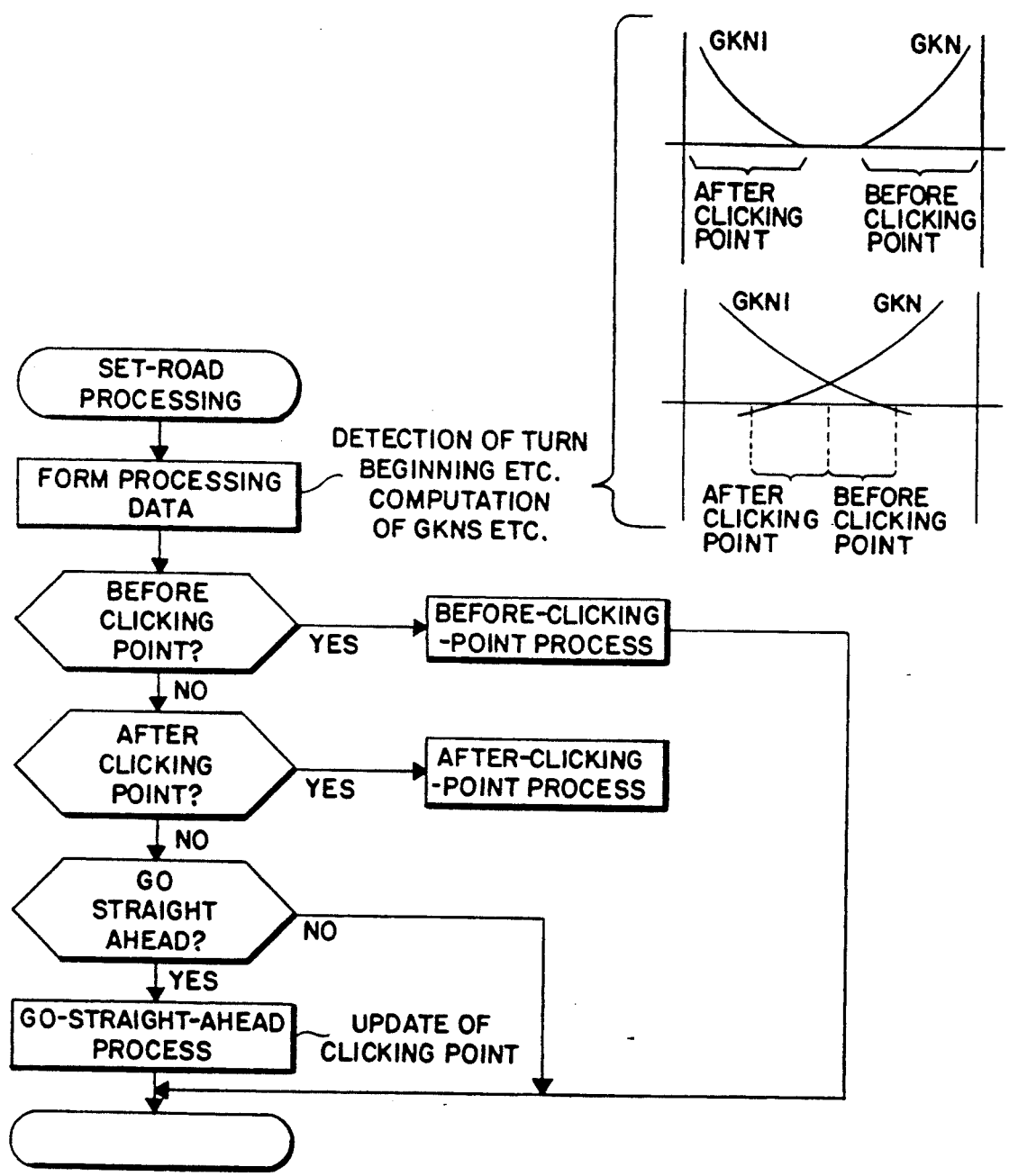
FIG. 19 is a flowchart of a travelled-road setting.
Figure 20:
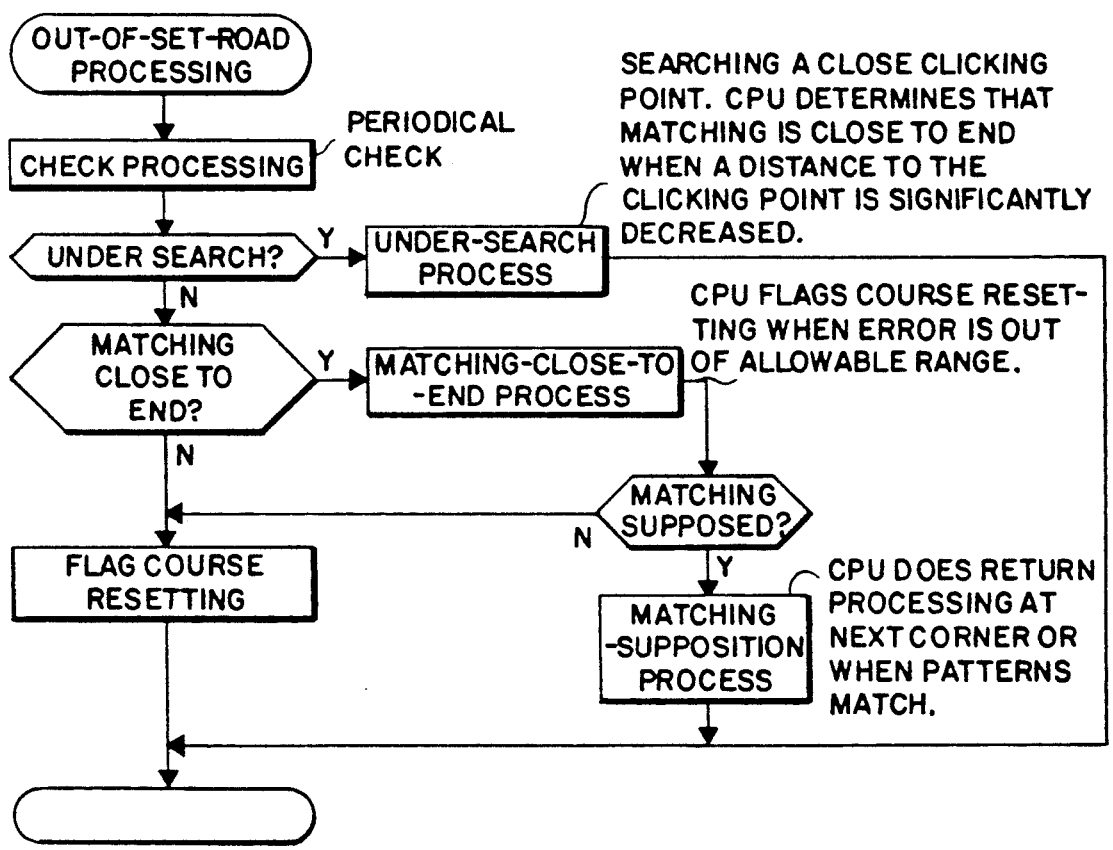
FIG. 20 is a flowchart of an out-of-set-road processing.
Figure 21:
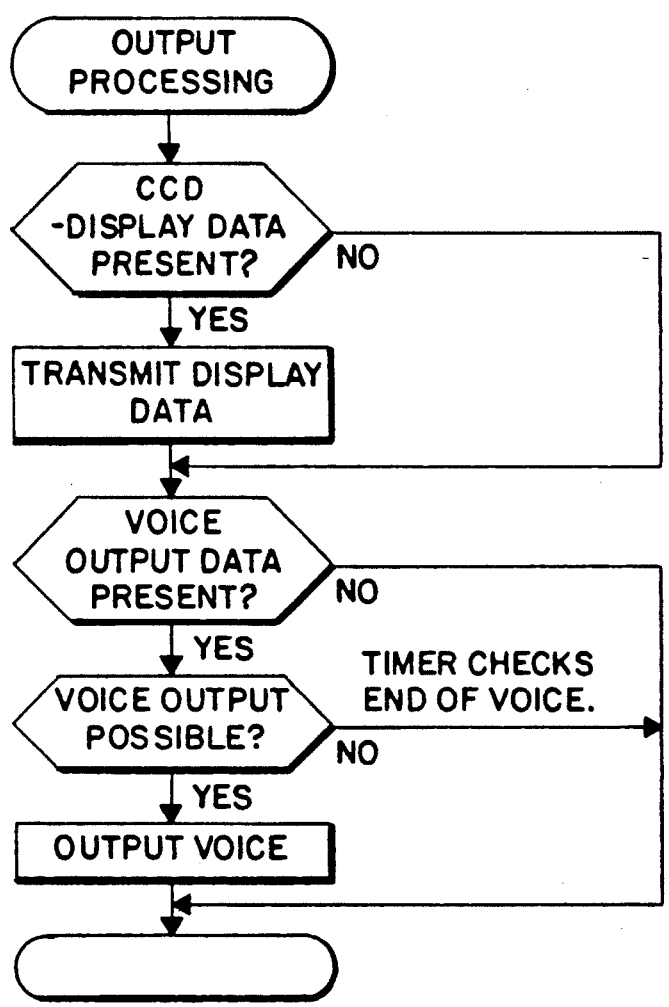
FIG. 21 is a flowchart of an outputting to a display and voice alarm.
Figure 22:
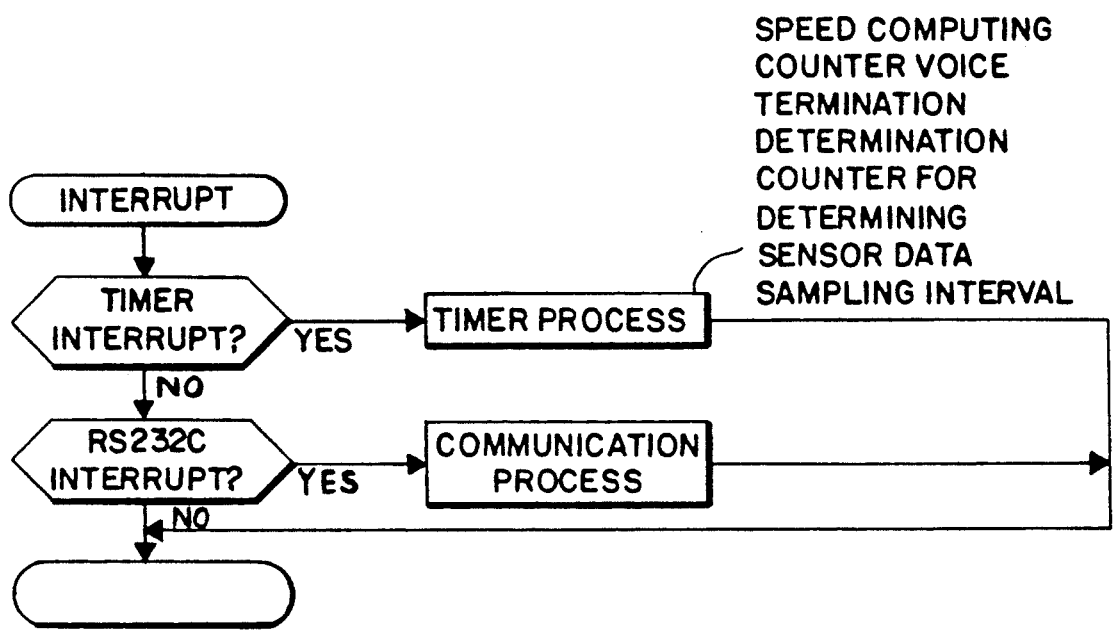
FIG. 22 is a flowchart of an interrupt.

FIG. 5 is a general flowchart of a controller 201. FIG. 11 is a flowchart of a button entry processing. FIG. 12 is a flowchart of a course setting. FIG. 13 is a flowchart of a travelled course alternatives or preferences entry processing. FIG. 14 is a flowchart of an attribute comparison for a travelled course determination. FIG. 15 is a flowchart of the travelled course determination for producing data applicable to the navigation system of FIG. 1. FIG. 16 is a flowchart of a navigation data entry processing. FIG. 17 is a flowchart of an actual navigation of a car. FIG. 18 is a flowchart of a map matching. FIG. 19 is a flowchart of a travelled road setting. FIG. 20 is a flowchart of an out-of-set-road processing. FIG. 21 is a flowchart of an outputting to a display and voice alarm. FIG. 22 is a flowchart of an interrupt which is caused by a timer or RS232C.

Figure 23:
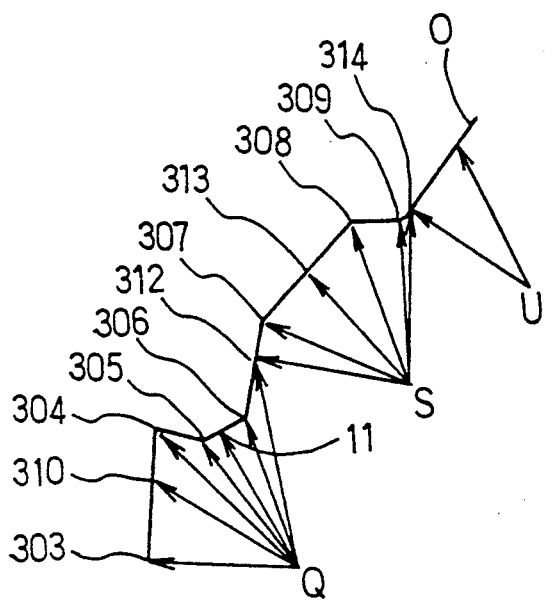
FIGS. 23–25 are illustrations of a map matching.
Figure 24:
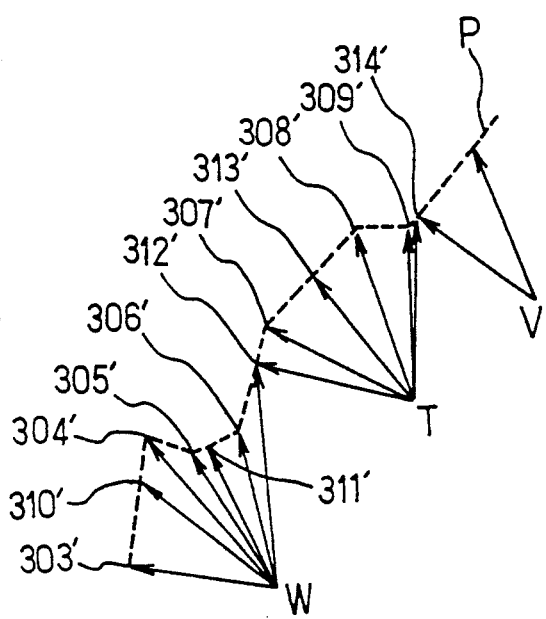
Figure 25:
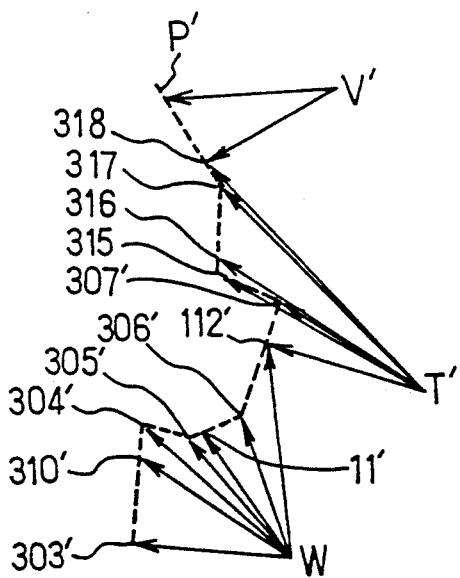

FIGS. 23–24 illustrate a map matching. A travelled course is indicated at O. Points which a gyro-sensor has detected turning points by its rotational speed detection are indicated at 304', 305', 306', 307', 308' and 309'. When the car starts from points 303 and 303', the system extends normals 303Q and 303'W with an equal length to the travelled courses O and P from the travelled courses O and P to point Q and W. Then, the system divides the travelled courses O and P every 100 m into a 303–310 section, 303'–310' section, 310–311 section, 310'–311' section, 311–312 section, 311'–312' section, 312–313 section, 312'–313' section, 313–314 section and 313'–314' section. Then, the system extends normals 312S, 312T', 314U and 314V' to the travelled courses O and P from the travelled courses O and P to points S, T', 314U and 314V' every 200 m of each of the travelled courses O and P. The 200 m may be alternatively replaced by 400 m or 500 m. The system compares the vectors of the points Q, S and U with the vectors of the points W, T and V to produce corresponding possible differences. When these differences fall within a predetermined allowable range, the system determines the matching of the travelled courses O and P and equals the travelled course P with the travelled course O. If as shown in FIG. 25, the car takes the course P' having the vectors 315, 316, 317 and 318 of the point T', the car apparently goes out of the travelled course O. Thus, adding a pattern recognition matching using vectors to the art of the Japanese patent applications facilitates the OUT-OF-SET-ROAD processing of FIG. 20. In particular, when the system recognizes that the points 307 and 307' corresponds, the point 307 provides a clicking point in response to a mismatching of the vector 307 of the point S and vector 307' of the point T'. Thus, the system determines that the point 315 apparently is out of the set travelled course O. Since a clicking point is one of apecies of a polygon, the system determines that the car has taken a course out of the set travelled course. When the system determines that a travel direction of the car apparently is out of that of the set travelled course after the clicking point. Thus, the system quickly closes an UNDER SEARCH processing and flags a travelled course resetting to start a new travelled course setting.

What is claimed is:

1. A navigation system comprising:
   a map data base comprising a plurality of polygons each side of each of said polygons corresponding to a road of a predetermined rank;
   a display;
   a first means coupled to said display for reading said map data base and for providing on said display at least a selected portion of said map data base and for providing on said display a straight line in said map data base connecting a first point in the selected portion of said map data base to a second point in said map data base;
   a second means for selecting from said plurality of polygons in said map data base a chain of polygons disposed about said straight line, said chain of polygons connecting a first terminal polygon to a second terminal polygon wherein a first side of said first terminal polygon includes said first point and a first side of said second terminal polygon includes said second point with each polygon in said chain of polygons having at least one side common to an adjacently disposed polygon and wherein the second means provides a perpendicular line from a center point of each of the polygons in said chain of polygons to said straight line and said second means determines which one of said polygons have the shortest perpendicular line between said center points and said straight line; and
   a third means for selecting predetermined ones of the sides of said polygons in said chain of polygons, each of said selected sides being connected to at least one other selected side to provide at least one continuous route from said first point to said second point and for computing a distance between said first point and second point along each of a plurality of the routes and for determining a most appropriate route based on at least said computed distances.

2. The navigation system of claim 1 wherein:
   said first point in said map data base corresponds to a starting point;
   said second point in said map data base corresponds to a destination point; and
   said second means provides said chain of polygons by selecting a first polygon and by selecting a second polygon having a first side adjoining a first side of said first polygon and wherein said second means selects subsequent polygons one by one until such selected polygons form said chain of polygons connecting said first terminal polygon to said second terminal polygon.

3. The navigation system of claim 2 wherein said second means, when selecting said polygons to provide said chain of polygons, excludes a polygon which has been previously selected as an alternative polygon when selecting a next polygon.

4. The navigation system of claim 3 further comprising:
an integrated circuit card having said map data base digitally stored thereon; and
wherein said integrated circuit card is disposed in said first means and said first means reads said digital map data base from said integrated circuit card.

5. The navigation system as recited in claim 1, wherein when the at least one route from the first point to the second point comprises a road having a first predetermined rank connecting a third point to a fourth point and said third means determines a road having a second, more significant predetermined rank connecting said third point to said fourth point, said third means replaces the road having the first predetermined rank with the road having the second, more significant predetermined rank.

6. The navigation system as recited in claim 1, wherein when a car having the navigation system disposed therein travels on a road out of the computed route and the out-of-the-computed-route road corresponds to a side of a polygon in said chain of polygons, the third means computes a new route to the second point wherein a current position of the car provides a new first point.

7. The navigation system as recited in claim 1, further comprising a direction indicator coupled to said third means wherein when a car having the navigation system therein goes to a road out of a selected route and the out-of-the-selected-route road fails to correspond to a side of a polygon in said chain of polygons, the direction indicator indicates a travel direction to direct the car to a road in the selected route.

8. A method of determining a route between a first point and a second point in a map data base said method comprising the steps of:
reading the map data base, said map data base provided by a plurality of polygons each side of said polygons corresponding to a road having a predetermined rank;
providing a straight line in said map data base from the first point in said map data to the second point in said map data base;
selecting from said plurality of polygons a chain of polygons disposed about said straight line, said chain of polygons connecting a first terminal polygon to a second terminal polygon wherein a first side of said first terminal polygon includes said first point and a first side of said second terminal polygon includes said second point with each of said polygons in said chain of polygons having at least one side common to an adjacently disposed polygon on said chain;
providing, with a second means, a perpendicular line from a center point of each of the polygons in said chain of polygons to said straight line;
determining, with the second means, which one of said polygons have the shortest perpendicular line between said center points and said straight line;
selecting, with a third means, at least one route between said first and second points with said route comprised of at least one side of each of said polygons in said chain of polygons;
computing, with said third means, a distance of each of the routes selected; and
determining, in response to at least said step of computing, a most appropriate route of said selected routes between said first point and said second point based on said computed distances.

9. The method of claim 8 wherein:
said first point in said map data corresponds to a starting point;
said second point in said map data corresponds to a destination point; and
the step of selecting said chain of polygons comprises the steps of:
selecting a first polygon having a first side adjacent a first side of a first one of said first and second terminal polygons;
selecting a second polygon having a first side adjoining a first side of said first polygon; and
selecting subsequent polygons one by one until such selected polygons form said chain of polygons connecting said first terminal polygon to said second terminal polygon.

10. The method of claim 9 wherein said step of selecting a next polygon to provide said chain of polygons includes the step of excluding a polygon which has been previously selected as an alternative polygon in said chain of polygons.

11. The method of claim 10 wherein the step of reading said map data base includes the step of reading said map data base from an integrated circuit card.

* * * * *

UNITED STATES PATENT AND TRADEMARK OFFICE
CERTIFICATE OF CORRECTION

PATENT NO. : 5,204,817
DATED : April 20, 1993
INVENTOR(S) : Motomasa Yoshida

It is certified that error appears in the above-indentified patent and that said Letters Patent is hereby corrected as shown below:

Column 2, line 6, "alternative" should read --alternatives--.

Column 2, line 18, "an digitizer" should read --a digitizer--.

Column 2, line 64, "signal" should read --signals--.

Column 4, line 5, "arrive the" should read --arrive at the--.

Column 5, line 10, both occurences of "road a" should read --road a--.

Column 5, line 12, "road a" should read --road a--

Column 5, line 13, "road a" should read --road a--.

Column 5, line 14, "road a" should read --road a--.

Column 5, line 55, "traffic jam in or an under-construction of a road of the" should read --traffic jam or a road under-construction of the--.

Column 8, line 4, "corresponds" should read --correspond--.

UNITED STATES PATENT AND TRADEMARK OFFICE
CERTIFICATE OF CORRECTION

PATENT NO. : 5,204,817
DATED : April 20, 1993
INVENTOR(S) : Motomasa Yoshida

It is certified that error appears in the above-indentified patent and that said Letters Patent is hereby corrected as shown below:

Column 8, line 13, "point. Thus," should read --point, the--.

Signed and Sealed this

Twenty-fourth Day of May, 1994

Attest:

BRUCE LEHMAN

*Attesting Officer*  *Commissioner of Patents and Trademarks*